United States Patent
Dorn et al.

(10) Patent No.: US 12,145,060 B2
(45) Date of Patent: Nov. 19, 2024

(54) METHODS AND SYSTEMS TO ACTIVATE SELECTIVE NAVIGATION OR MAGNIFICATION OF SCREEN CONTENT

(71) Applicants: Sony Interactive Entertainment LLC, San Mateo, CA (US); Sony Interactive Entertainment Inc., Tokyo (JP)

(72) Inventors: Victoria Dorn, San Mateo, CA (US); Steven Osman, San Francisco, CA (US); Bethany Tinklenberg, San Mateo, CA (US)

(73) Assignees: Sony Interactive Entertainment LLC, San Mateo, CA (US); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/827,475

(22) Filed: May 27, 2022

(65) Prior Publication Data
US 2023/0381645 A1  Nov. 30, 2023

(51) Int. Cl.
*A63F 13/52* (2014.01)
*A63F 13/213* (2014.01)
*G06F 3/01* (2006.01)

(52) U.S. Cl.
CPC .......... *A63F 13/52* (2014.09); *A63F 13/213* (2014.09); *G06F 3/013* (2013.01); *A63F 2300/1087* (2013.01); *A63F 2300/66* (2013.01)

(58) Field of Classification Search
CPC .... A63F 13/52; A63F 13/213; A63F 2300/66; A63F 2300/1087; G06F 3/013
See application file for complete search history.

(56) References Cited

U.S. PATENT DOCUMENTS

| | | | |
|---|---|---|---|
| 11,391,945 B2 * | 7/2022 | Wiggeshoff | G06F 3/011 |
| 2012/0146891 A1 | 6/2012 | Kalinli | |
| 2014/0123162 A1 * | 5/2014 | Karlsson | H04N 21/44218 725/12 |
| 2014/0364212 A1 | 12/2014 | Osman et al. | |
| 2015/0130703 A1 * | 5/2015 | Ghajar | G06F 3/013 345/156 |
| 2016/0026245 A1 * | 1/2016 | Mantiuk | G06T 7/143 382/103 |
| 2016/0214015 A1 | 7/2016 | Osman et al. | |
| 2017/0169662 A1 * | 6/2017 | Froy | G06Q 30/0261 |

(Continued)

FOREIGN PATENT DOCUMENTS

EP  2648604 B1  12/2021

OTHER PUBLICATIONS

Notification of Transmittal of the ISR & Written Opinion PCT/US2023/021051, and the Written Opinion, dated Jul. 24, 2023.

*Primary Examiner* — Omkar A Deodhar
*Assistant Examiner* — Shauna-Kay N. Hall
(74) *Attorney, Agent, or Firm* — Penilla IP, APC

(57) ABSTRACT

Methods and systems are provided for providing navigation assistance using eye gaze of a user. An example method provides assistive navigation in a video game. The method includes receiving input from a user device during a gameplay session of the video game. The method further includes capturing eye gaze of the user during the gameplay to identify a region of a scene of the video game associated with said eye gaze. Then, activating gaze navigation to move a focus of the scene to the region identified using the captured eye gaze. The gaze navigation is triggered automatically without said input from the user device.

18 Claims, 7 Drawing Sheets

(56) References Cited

U.S. PATENT DOCUMENTS

| | | |
|---|---|---|
| 2017/0212583 A1* | 7/2017 | Krasadakis ............ G06F 3/0482 |
| 2017/0235361 A1* | 8/2017 | Rigazio .................. G06F 9/453 |
| | | 715/710 |
| 2018/0004289 A1* | 1/2018 | Wilson .................... G06F 1/163 |
| 2018/0061116 A1* | 3/2018 | Mitchell ................. G06F 3/011 |
| 2018/0311583 A1 | 11/2018 | Osman et al. |
| 2019/0099660 A1* | 4/2019 | Nelson ............... A63F 3/00157 |
| 2019/0354173 A1 | 11/2019 | Young et al. |
| 2020/0209958 A1* | 7/2020 | Sztuk ...................... A63F 13/26 |
| 2020/0330869 A1 | 10/2020 | Osman et al. |
| 2021/0191513 A1 | 6/2021 | Young et al. |
| 2021/0322888 A1 | 10/2021 | Arroyo Palacios et al. |
| 2022/0152498 A1 | 5/2022 | Osman et al. |
| 2022/0334637 A1* | 10/2022 | Sharma .................... G06N 3/08 |
| 2023/0044972 A1 | 2/2023 | Young et al. |

* cited by examiner

Gaze Navigation

Gaze Zoom

METHODS AND SYSTEMS TO ACTIVATE SELECTIVE NAVIGATION OR MAGNIFICATION OF SCREEN CONTENT

BACKGROUND

1. Field of the Disclosure

The present disclosure relates generally to video game navigation functions to facilitate user interactivity.

2. Description of the Related Art

The video game industry has seen many changes over the years. Uses are now able to play video games using many types of peripherals and computing devices. Sometimes video games are played using a game console, where the game console is responsible for processing the game and generating the interactive input presented on display screens. Other times, video games are played in streaming mode, where a server or servers execute the game remotely and users provide input over a network connected device.

Although the hardware and peripheral devices used for playing video games has continued to increase in number and variation, there still is a need to facilitate the communication of user input. Most user input is made using a peripheral device, e.g., a game controller or mouse/keyboard. However, some users are not able to immediately convey their navigation inputs in a time or context efficient way. These limitations may be due to non-familiarity of a game environment or some physical handicap of the user.

It is in this context that implementations of the disclosure arise.

SUMMARY

Implementations of the present disclosure include methods, systems, and devices for providing navigation assistance using eye gaze of a user. In one embodiment, a method for providing assistive navigation in a video game is provided. The method includes receiving input from a user device during a gameplay session of the video game. The method further includes capturing eye gaze of the user during the gameplay to identify a region of a scene of the video game associated with said eye gaze. Then, activating gaze navigation to move a focus of the scene to the region identified using the captured eye gaze. The gaze navigation is triggered automatically without said input from the user device.

In some embodiments, the focus is moved by translating the focus gradually toward the region identified using the captured eye gaze. In some embodiments, the gaze navigation is deactivated upon receiving an input from a user device directing the movement of the focus away from the region.

In some embodiments, deactivating the gaze navigation stops the translating of the focus. In some embodiments, the gaze navigation remains active while the captured eye gaze remains toward the region of the scene for a period of time that exceeds a first threshold amount of time.

In some embodiments, the method activates a gaze zoom at the region. The gaze zoom is activated after a second threshold amount of time is detected wherein the eye gaze remains toward the region of the scene, or In some embodiments, the method activates a gaze zoom at the region. The gaze zoom is activated after a reflex eye gaze is detected when the eye gaze is toward the region of the scene. In one embodiment, the reflex eye gaze can be an intentional or non-intentional blink pattern, squint, a head motion, a body motion, a lean-in, etc. In some embodiments, the reflex eye gaze is processed to determine an intent of the user needing a zoom-in view or a zoom-out view of the region. In still other embodiments, the reflex eye gaze is an intentional eye movement to express a wink, a blink, a blink pattern, or the like.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

Figure 1A:
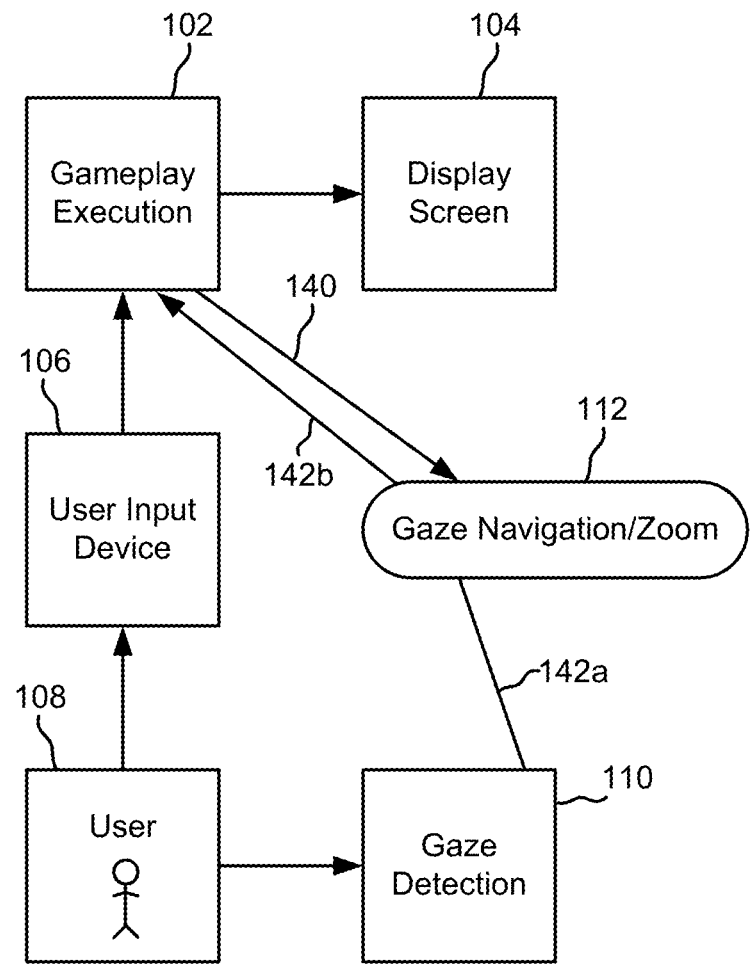
FIG. 1A illustrates a block diagram of gameplay execution occurring during gameplay by a user, in accordance with one embodiment.

The following implementations of the present disclosure provide methods, systems, and devices for providing navigation assistance using eye gaze of a user. In one embodiment, a method for providing assistive navigation in a video game is provided. The method includes receiving input from a user device during a gameplay session of the video game. The method further includes capturing eye gaze of the user during the gameplay to identify a region of a scene of the video game associated with said eye gaze. Then, activating gaze navigation to move a focus of the scene to the region identified using the captured eye gaze. The gaze navigation is triggered automatically without said input from the user device.

In one embodiment, an area on the screen that a user is looking at for a pre-defined period of time can be enlarged. User eye gaze tracking is used to enable tracking of regions that a user is viewing, and determine the user's intent. In some cases, a squint detector process can be executed to determine if the eyes of the user are acting under an intentional blinking, a blink sequence, a winking, a specific eye movement, etc. In one embodiment, a routine can be processed to verify eye movement patterns, e.g., squint, stair, eye brow movement and/or combinations thereof data against user profile or model created using machine learning and training.

The verification can, in some configurations determine if user has "lazy-eye" syndrome or nervous twitching/squinting that needs to be filtered out before activating automatic navigation or zoom for the user. In some embodiments, the direction of gaze can be analyzed prior to a zoom-in or zoom-out of a region of an interactive scene shown on a screen. Still further, body movements plus eye movements can be analyzed to interpret user intent, e.g., whether to enable automatic navigation, enable zoom-in, enable zoom-out, or adjust a specific setting automatically for the user (i.e., without specific input by a user device or peripheral). For example, if user leans in, this may be a processing cue that the user wishes for a zoom-in function. If user continues to squint, then the system may determine or predict that user wishes more zoom-in to specific content. In some configurations, raised eyebrows can enable/disable navigation, magnification and/or zoom.

In one embodiment, a move-focus function can be enabled to automatically activate navigation to a specific region of a display. By way of example, if the user is focused on some specific region of interactive content, the user's focus can be automatically moved, e.g., translated by navigating the user to that region. This navigation, in one embodiment, can be similar to the way a joystick moves an avatar around an interactive space, but without the user having to provide that input to a joystick or peripheral. In one embodiment when the gaze is detected to be focused on some part of the screen, the automatic navigation can be triggered. Triggering the automatic navigation can be based on the user's profile model, which trains on the user's tendencies for different interactive contexts or scenarios. In some embodiments, the triggering can alternatively or additionally be based on time thresholds. In addition to thresholds, the triggering or activation can be based on detecting other user face indictors. The indicators, as noted above, can be eye brow raising, blinking, blinking multiple times or on some pattern, full face expressions, or combinations thereof.

In one example, if a user is looking to the upper left for a few seconds (beyond a threshold time), then a move-focus is automatically activated (e.g., like moving the joystick toward some part of the interactive environment on the screen). In another embodiment, a zoom at focus is also activated if the user continues to look/gaze to that direction, e.g., showing high interest to that part of the screen/content of the interactive space.

With the above overview in mind, the following provides several examples figures to facilitate understanding of the example embodiments.

FIG. 1A illustrates a block diagram of gameplay execution 102 occurring during gameplay by a user 108, in accordance with one embodiment. In this example, the user 108 can be utilizing a user input device 106. The user input device can be any type of peripheral used for interacting with a game and to enable gameplay. In one embodiment, the computer or device utilized for enabling gameplay by the user 108 will have a camera. The camera can be facing the user while the user plays the game. In some embodiments, more than one camera can be facing the user. In some cases, the cameras are built into the device, such as on a display screen. In other embodiments, a separate camera can be placed proximate to the display screen, so as to capture the user's face. In another embodiment, the user may be interacting with a game utilizing a head-mounted display (HMD). The HMD can also include one or more cameras located within the HMD and facing the eyes of the user. The eyes of the user can therefore be tracked utilizing the gaze detection 110 using video data captured by the cameras of the HMD. Accordingly, the embodiments described herein and the related eye gaze utilized for gaze input can be utilized in any type of hardware configuration.

In one configuration, eye gaze detection software is executed by the computer. The eye gaze detection software is configured to focus on the eyes of the user during the user's interaction and gameplay. Gaze detection 110 is code that can be executed for the eye gaze detection software processing. Gaze detection 110 can be a separate computing program run on the local device, or can be executed and run on a remote computer. Gaze detection 110 is configured to focus on the eyes of the user 108 during the user's gameplay and gameplay execution 102, that provides interactive scenes on a display screen 104. The user input device 106 is utilized by the user, and the user space is tracked using the gaze detection 110. In one embodiment, the eye gaze detection 110 generates information that characterizes the eye gaze of the user. Based on the characterization of the eye gaze by the user, that information is processed by a gaze navigation and zoom process 112. The gaze navigation and zoom process 112 provides information to the gameplay execution 102.

The information provided by the gaze navigation and zoom process 112 includes gaze data 142a. The gaze navigation and zoom process 112 will then generate gaze input 142b. State data 140 is continuously shared with the gaze navigation and zoom process 112. In this manner, gaze navigation and zoom process 112 is able to provide the gaze input to the game execution 102. By way of example, as the user plays the game, the game execution will display different content on the display screen 104. In one configuration, the user 108 may be focused on a specific part of the screen, away from the current location where the user's avatar is or the current action might be.

This focus by the user 108 is captured by the gaze detection 110, and based on whether the user is focusing on that area for a sufficient amount of time to qualify threshold time, the gaze navigation and zoom 112 can generate gaze input 142b. The gaze input 142b can function to automatically navigate the focus of the user to a new region of the display screen consistent with the user's focus. In some embodiments, the user may be squinting when focused on that region, and the squinting can be taken as an input when captured by the gaze detection 110. The squinting can then be analyzed by the gaze navigation and zoom 112 to produce a gaze input 142b.

As mentioned above, sometimes a user may not actually intend to be looking at a different region for purposes of navigation. False positives can be filtered out by the gaze navigation and zoom process 112. For example, if the user stops looking at a specific region before the threshold amount of time, then the automatic navigation will not be activated. In another embodiment, if the user provides input via the user input device 106 that is inconsistent with the automatic navigation, then the automatic navigation may be stopped and the user's focus returned to where the user was actively playing or originally playing. In another embodiment, automatic navigation may be stopped or deactivated responsive to the user's direct eye movement that is being tracked using gaze detection 110. The direct eye movement can be intentional, and can be preset by the user during a calibration process.

The calibration process can allow a user to set different inputs consistent with different eye movements. For example, the user can set a blinking pattern that provides one type of input, and another blinking pattern the provides a different type of input. In other embodiments, a facial expression can activate one input, and an opposite facial expression can be activating the input. In some embodiments, a combination of eye movement, and/or facial expressions can be used to activate or deactivate automatic movements triggered as gaze input 142b.

In still other embodiments, machine learning can be utilized to learn a user's gaze patterns for specific types of content and game context. For example, if the user typically blinks a lot during an explosion, that type of blinking may be filtered out automatically as not meaning a type of gaze input 142b desired by the user. In other embodiments, the user may wish the machine learning to detect early activation of automatic movements when the focus moves to a new region quickly, and without having to qualify a specific threshold amount of time. In other embodiments, the predicted intent of the user can be learned using machine learning, and that gaze inputs 142b can be tailored based on the content of the game being played. In other embodiments, the system may learn a user's handicap. The user's handicap can be how a user's eyes move, failed to move, a wandering eye, a fast-blinking eye(s), or lack of focus. These types of handicaps can be identified and filtering algorithms can be applied to avoid prematurely inputting a gaze input 142b automatically by the system.

Figure 1B:
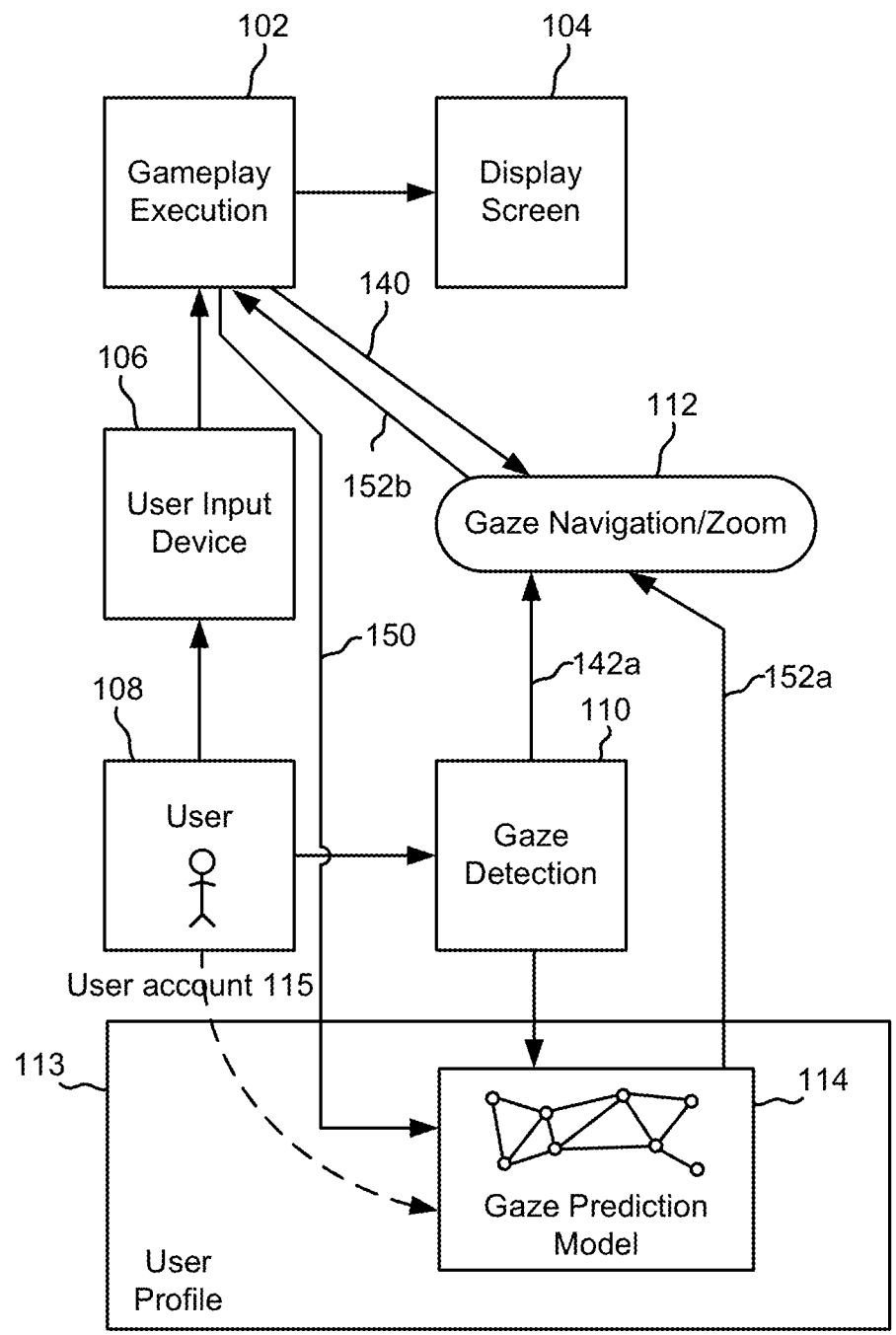
FIG. 1B illustrates an alternate embodiment where the user's profile can be utilized to improve the gaze navigation and zoom process, in accordance with one embodiment.

FIG. 1B illustrates an alternate embodiment where the user's profile 113 can be utilized to improve the gaze navigation and zoom process 112, in accordance with one embodiment. In this configuration, the user profile 113 is associated with the user having a user account 115. The user count can be one that is associated with a video game provider. The video game provider can have a website where they can login and access games, accessed her profile, interact with other gamers, purchase games, participate in online games, spectate on games, view E-sports, access virtual-reality content, and generally play, view, or discuss video games or interactive entertainment. The user profile 113 is shown to include a gaze prediction model 114.

The gaze prediction model 114 is generated responsive to training of the model over a period of time. In this manner, the gaze prediction model 114 is custom tailored to the user, and is based on learning of the user's tendencies for different types of game contexts. In this configuration, the gaze navigation and zoom process 112 may generate the gaze input 142b/152b that is provided to the gameplay execution 102, so that the gaze input 142b/152b can be used game input instead of e.g., controller input (i.e., button presses, joystick movements, interial sensor input, etc). In this illustration, the gaze prediction model 114 provides output to the gaze navigation and zoom process 112, along with or instead of the output from the gaze detection 110. The gaze navigation and zoom process 112 is also receiving context data 1140 from the gamplay execution 102. Based on these inputs, the gaze navigation and zoom process 112 selects a type of gaze input and amount of said gaze input 152b to send to the gameplay execution 102.

In general terms, the gaze input 152b is an input that provides control signals similar to those that could be provided using a controller (i.e., the user input device 106). The control signals function to not only identify the type of gaze input, e.g., move to the right, slide to left, press joystick up/right, press X button, press trigger, double click to shoot, input a zoom-in, input a zoom-out, discontinue translation movement, speed up translation movement, and any number of input combinations useful for the game and context. In the example of FIG. 1B, the gaze input 152b is based at least in part on the gaze detection 110 data, game context, one or more system programmed settings, machine learning and the information provided by the gaze prediction model 114. In the example of FIG. 1A, the gaze input 142b is based at least in part on the gaze detection 110 data, game context, and one or more system programmed settings. In one embodiment, the embodiment of FIG. 1B is more customized to the user, as the gaze prediction model 114 is constructed from training data collected from the user.

Figure 1C:
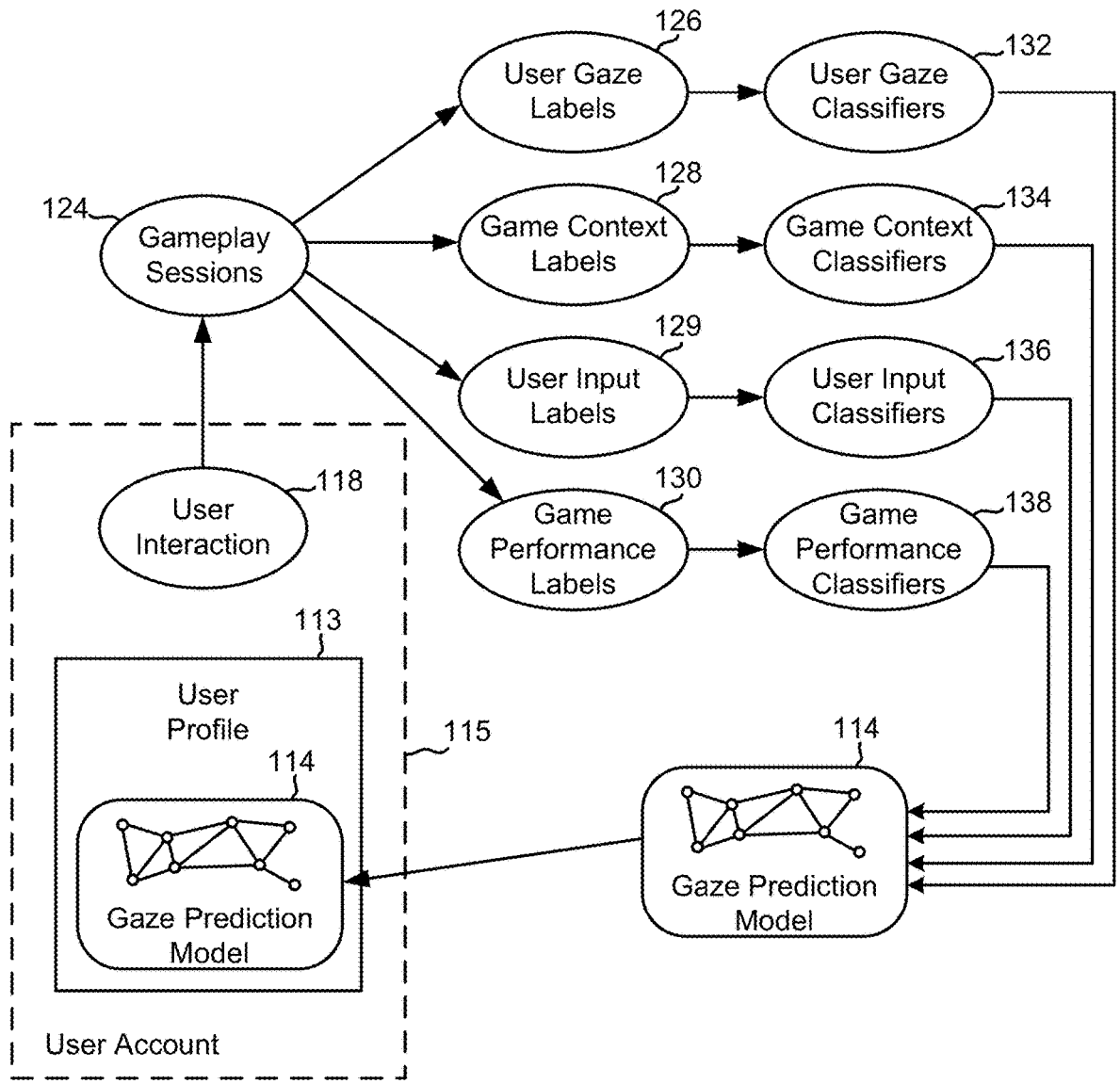
FIG. 1C illustrates an example of a machine learning process, in accordance with one embodiment.

FIG. 1C illustrates an example of a machine learning process, in accordance with one embodiment. As shown, multiple game play sessions 124 can be executed by a user via user interactions 118. The user interactions 118 can occur over multiple sessions and multiple periods of time. Additionally, the user interactions 118 can be for different types of games that the user may play, consistent with a different game play session 124. During the machine learning process, a type of training is executed, which enables the learning of the user's input tendencies in order to predict what the user intends by the different gaze data collected using the cameras and processed utilizing the gaze navigation and zoom process 112. In this example, while the user is interacting with a game during a gameplay session 124, the user's gaze is processed in order to label the different types of gaze movements occurring during the gameplay session.

In addition, the game context is also analyzed to label the different types of game context 128 during the game play sessions. The game context labeled 128 relate to and correspond with the user gaze labels 126. While the user is playing a game during the gameplay session, the user input labels 129 and the game performance labels 130 are also processed. This allows for a correspondence between the user's gaze labels 126 and data collected from the game context labels 128 user input labels 129 and game performance labels 130.

Game performance labels, in one embodiment may include information that identify the skill level of the user, the success rate at specific tasks or actions, or points scored during specific tasks, actions, and in specific game context. Additionally, user gaze classifiers 132, game context classifiers 134, user input classifiers 136, and game performance classifiers 138 are also processed and provided to a game prediction model 114. The gaze prediction model 114 is an assembly of nodes that provide relationships between the various nodes in a neural network. The neural network over time is strengthened using the inputs provided during different game play sessions 124.

The strengthening of the neural network will allow the gaze prediction model 114 two be more robust and more able to predict what a user would do or wishes to do during a specific game, game context, and actions occurring in the specific game context. For example, if the user likes to focus on the timeclock in the top right-hand corner of the game, and the users' inputs are not directed in that region of the screen, then the gaze prediction model 114 will show that the user does not intend to navigate or moved to that region of the screen simply because a user looks that way during the game. In other contexts, it may be that the user wishes to move in that direction, and the gaze prediction model 114 will provide that gaze input 142b that enables input automatically for the user, in addition to (or instead of) the user input device inputs. As shown, as a gaze prediction model 114 grows in its training, that gaze prediction model 114 will be associated with the user profile 113 of user account 115. In this manner, the gaze navigation and zoom 112 process of FIG. 1B, can be utilized to not only analyze the state data 140 coming from the gameplay execution 102, but also the gaze prediction model 114.

Figure 2:
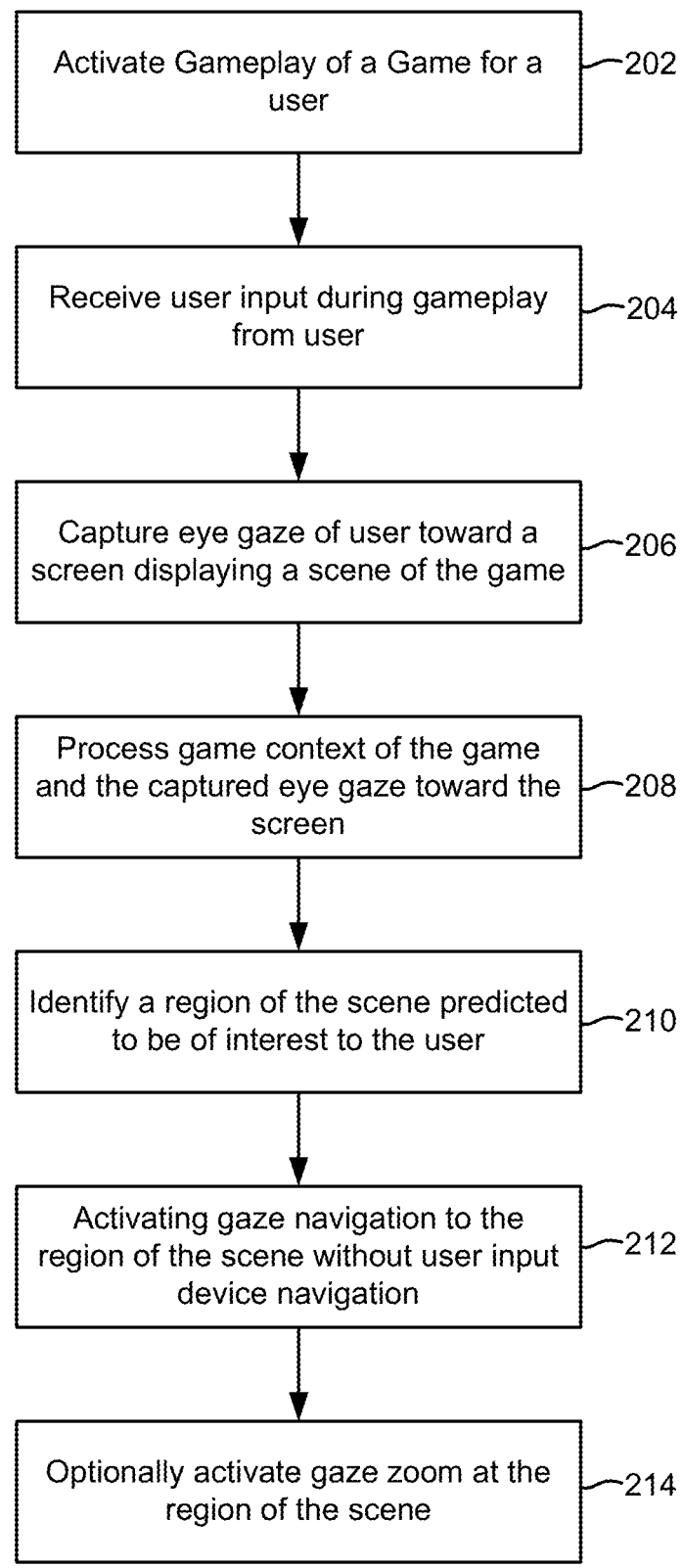
FIG. 2 illustrates one exemplary flow diagram, of utilizing a user's gaze to activate gaze navigation to a region of a scene without user input device navigation, in accordance with one embodiment.

FIG. 2 illustrates one exemplary flow diagram, of utilizing a user's gaze to activate gaze navigation to a region of a scene without user input device navigation, in accordance with one embodiment. In operation 202, gameplay of a game is activated by user. As mentioned above, the gameplay can be a game console gameplay, and HMD gameplay, online gaming gameplay, streaming gameplay, or any other type of interactivity that can be navigated by user utilizing inputs. Such other types of interactivities can include metaverse content, such as that utilized in HMD play or interactivity. During the gameplay, user input is received from a user in operation 202. The user input can be by way of a user input device, such as a peripheral device, controller, keyboard and mouse, or a combination thereof. In operation 206, eye gaze of the user is captured toward the screen displaying a scene of the game. The eye gaze of the user can be captured utilizing a camera that faces the user's eyes and/or face.

In one embodiment, the camera can be part of the device, part of the screen, affixed to a screen, placed over screen, placed in a location focusing on the user, integrated into an HMD, or any other device that can view and capture eye movement for gaze detection. In operation 208, a game context of the game is processed and the captured eye gaze toward the screen is also captured. As mentioned above, the game context can be state data 140, which the gaze navigation and zoom process 112 can receive during gameplay. In FIG. 1A above, this information is utilized to provide a gaze input 142b. In FIG. 1B, gaze prediction model 114 is additionally used along with the state data 140, in order to allow the gaze navigation and zoom process 112 to more intelligently predict the user's intent, before activating the gaze input 142b/152b or discontinuing the automatic movement or gaze zoom provided by the gaze input 142b/152b.

In operation 210, a region of the screen is identified as predicted to be of interest to the user. The prediction of interest in one embodiment can be made utilizing a time threshold of how long a user looks at a specific location on the screen. In another embodiment, the user's intent while looking at a specific region can also be gathered from body motion, head motion, eye blinking, patterns of blinking, brow movement, or combinations thereof. This information from the gaze detection 110 can therefore be used by the gaze navigation and zoom 112 to determine when to apply the gaze input 142b/152b, which then allows the game execution to automatically create and input that shown on the display screen 104. As mentioned above, and other way of identifying the predicted intent of the user is to utilize machine learning. If machine learning is utilized, a gaze prediction model 114 will provide additional indicia of when the user intends to navigate to a specific region of the screen utilizing the gaze input, and not requiring actual direct input by the user via a peripheral device. In one embodiment, the actual peripheral device would be a hand controller, a keyboard, or some other hand input machine.

In operation 212, gaze navigation is activated to allow the navigation to move to the region of the screen without the user input device navigation. The activation, in one embodiment, can be terminated or stopped if the user provides contrary input when the navigation starts. For example, if the navigation to the top right of the screen begins and the user does not intend to move to the top right of the screen, the user's movement on the controller, e.g., moved to the left on a joystick can discontinue the movement. Any other controller or device input that is inconsistent or opposite that of the automatic movement can be activate the movement when it starts. The deactivation can be intentional by the user, and in one embodiment machine learning can learn from that input provided by the user in order to formulate better training data ingested by the gaze prediction model 114.

In operation 214, an optional gaze zoom operation can be activated at the region of the scene. For example, once the automatic movement moves the user to the top right of the screen, the user may continue to stare or lean in toward the screen when at that location. These additional indicia can be utilized by the gaze zoom functionality in order to cause a zoom in to magnify that part of the screen. In one embodiment, these additional body, face, movement indicia are combined with the automatic movement in order to provide seamless navigation around different interactive scenes provided on a display.

Figure 3A:
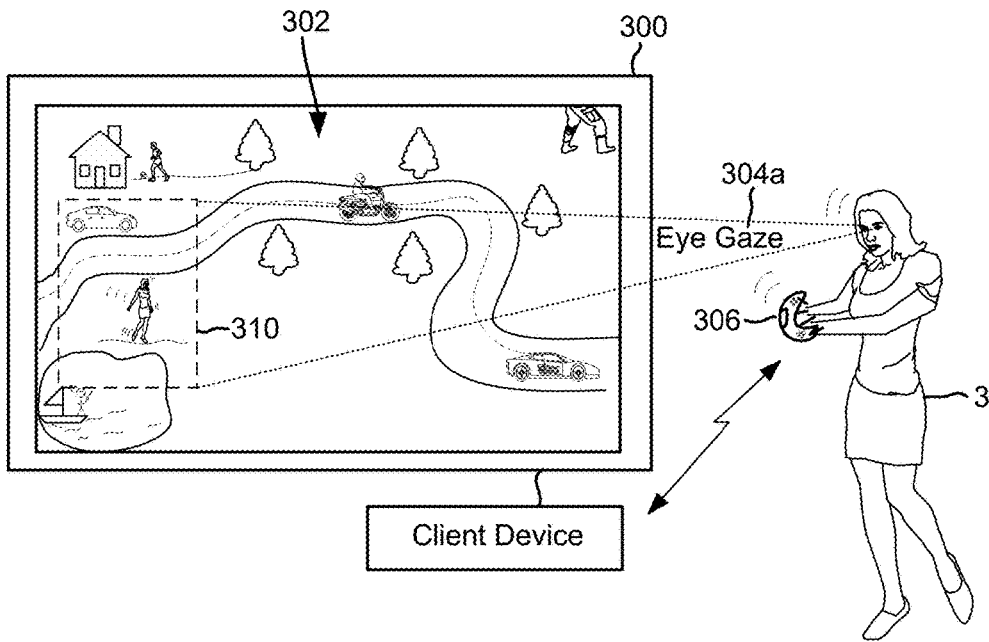
FIGS. 3A-3D illustrate examples of a user interacting with a scene rendered on a display and eye gaze used for providing gaze input (e.g., automatic navigation and/or zoom), in accordance with one embodiment.

FIG. 3A illustrates an example of a user 304 interacting with a scene 302 rendered on a display 300, in accordance with one embodiment. In this example, the client device is utilized to provide the interactive scene 302, which is being rendered on the display 300 and played by user 304. User 304 is utilizing a controller 306 to play a game. In this example, user 304 is focused on region 310, such as the location of the user's avatar moving about the virtual world or virtual space and scenes associated therewith. While the user 304 is interacting with the scene 302, eye gaze 304a is being tracked utilizing a camera associated with the client device or the display 300. As mentioned above, the same scene could be shown on an HMD, and cameras can be integrated into the HMD to provide the eye gaze detection 304a.

Figure 3B:
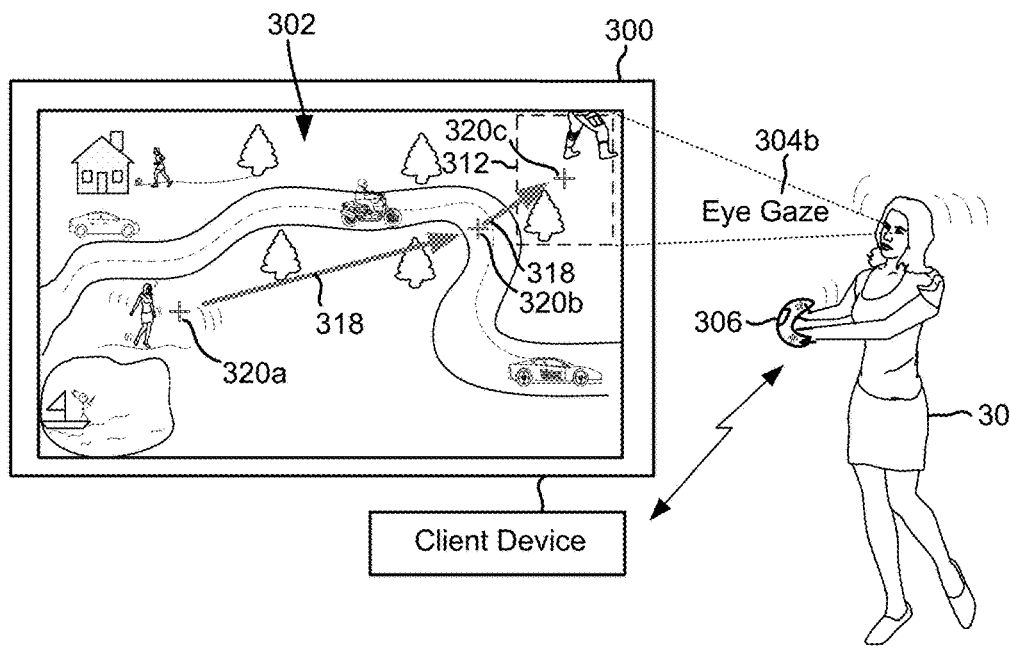

In FIG. 3B, the user 304 is shown to be viewing upwards with eye gaze 304b, and is appearing to focus on region 320c. Originally, user 304 was focused on region 320a, where the user's avatar was located. Based on the eye gaze indicia, the eye gaze will cause an automatic movement of the user's focus to the region 320c. Navigation arrows 318 are shown to illustrate the automatic movement of the focus region to region 320c, since the user 304 continues to look in the direction of region 320c for a threshold amount of time. In one embodiment, the threshold amount of time can be between about 1 to 10 seconds, or 2 to 5 seconds, or customized to the user's profile or learned gaze prediction model. Location 312, where region 320c is located then becomes the focus of the user automatically using gaze navigation.

Figure 3C:
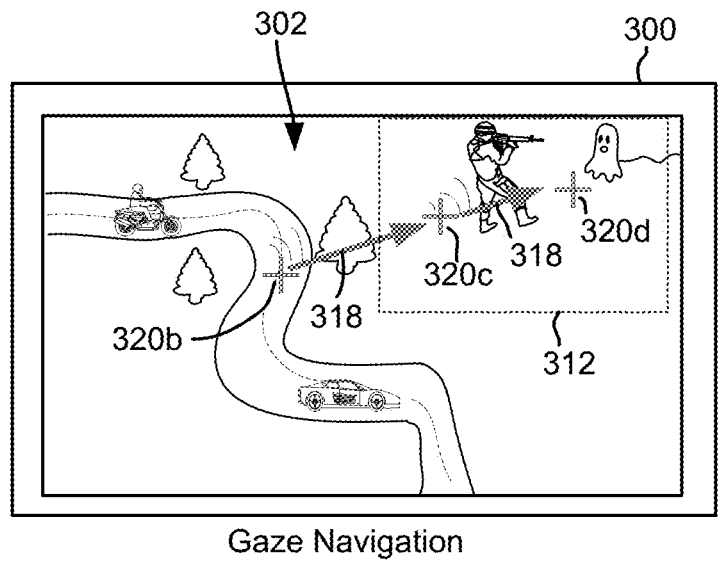

FIG. 3C illustrates how the screen has shifted so that the scene 302 now has uncovered a game character shooting a weapon at a ghost, where the user's focus is now at region 320d. As described above, navigation along arrow 318 moves automatically to shift the user to the new location, where the user wishes to view the action occurring in that region 312.

Figure 3D:
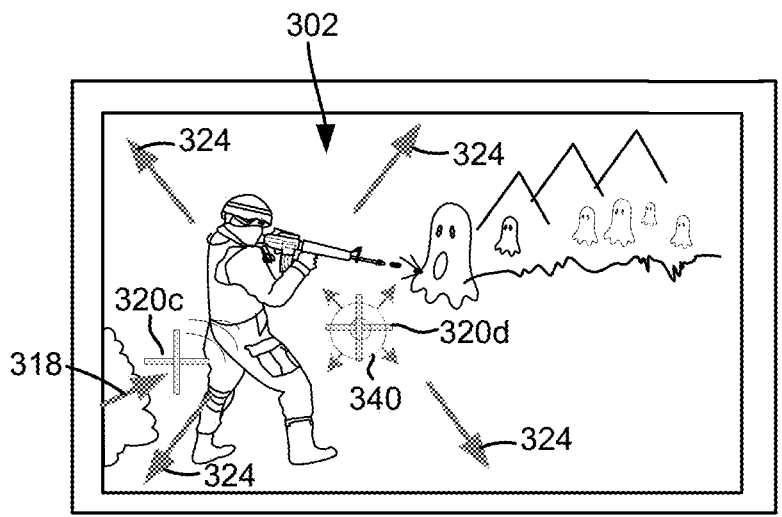

In FIG. 3D, user 304 may have been continuing to look in the direction of region 320d, and some additional indicia captured by the camera of the user space or eyes could have signaled that the user wishes to zoom in to that region and magnify the content in region 302. Magnification or zoom in 324 is shown where additional ghosts may be present in that region of activity. Indicator 340 shows that is zoom in is triggered by gaze zoom 340. As mentioned above, gaze zoom 340 may be triggered by the user continually or continuously looking in that direction of region 320d, and/or also blinking, leaning in, or providing a blinking pattern of the user's eyes that capture the intent of the user. As mentioned above, the blinking patterns, the additional indicia, and other motions or actions by the user to cause the gaze zoom 340 to be activated can be programmed by the user via settings, or can be automatically learned by the system using machine learning.

Figure 4:
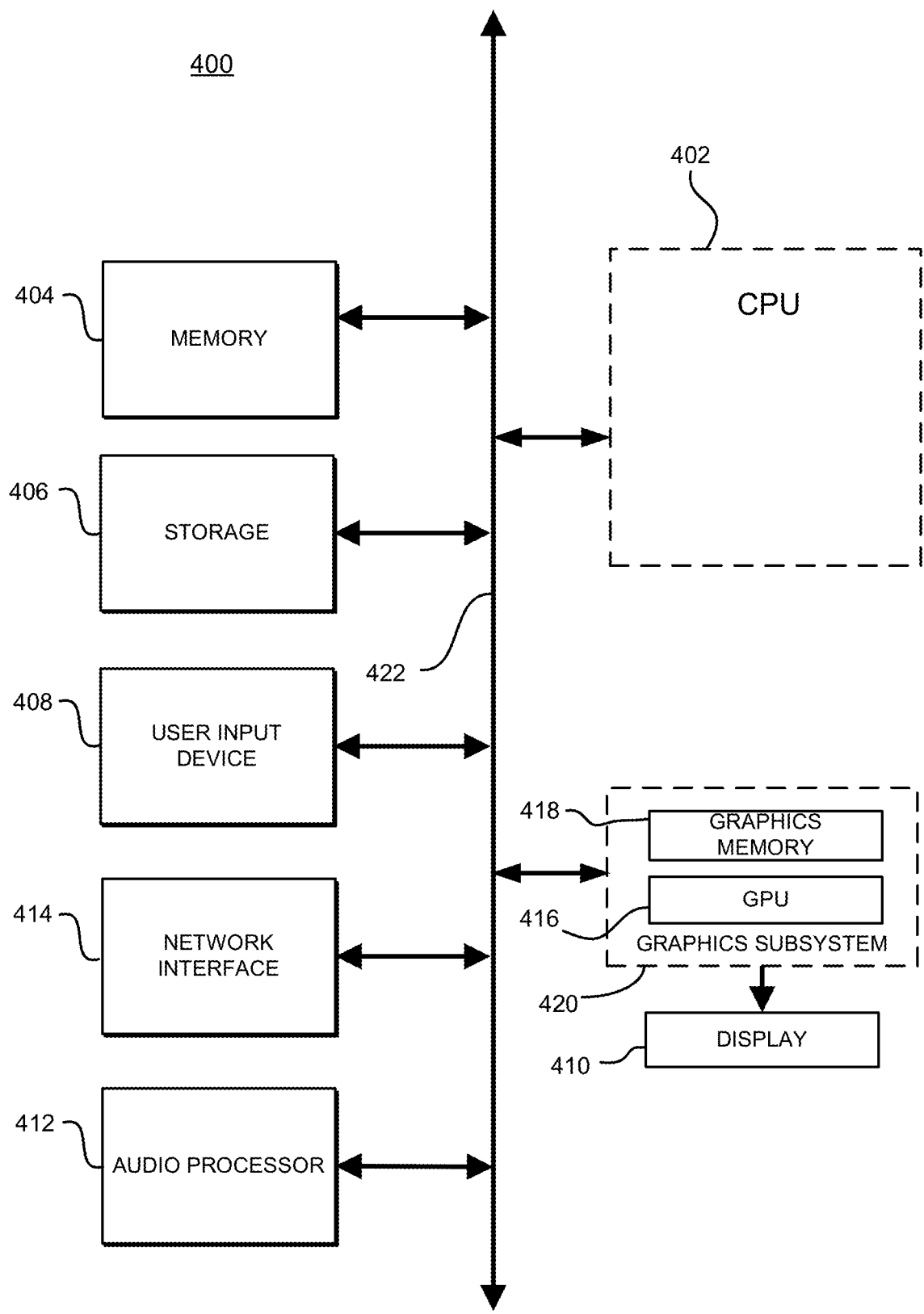
FIG. 4 illustrates components of an example device that can be used to perform aspects of the various embodiments of the present disclosure.

FIG. 4 illustrates components of an example device 400 that can be used to perform aspects of the various embodiments of the present disclosure. This block diagram illustrates a device 400 that can incorporate or can be a personal computer, video game console, personal digital assistant, a server or other digital device, suitable for practicing an embodiment of the disclosure. Device 400 includes a central processing unit (CPU) 402 for running software applications and optionally an operating system. CPU 402 may be comprised of one or more homogeneous or heterogeneous processing cores. For example, CPU 402 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 400 may be a localized to a player playing a game segment (e.g., game console), or remote from the player (e.g., back-end server processor), or one of many servers using virtualization in a game cloud system for remote streaming of gameplay to clients.

Memory 404 stores applications and data for use by the CPU 402. Storage 406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 408 communicate user inputs from one or more users to device 400, examples of which may include keyboards, mice, joysticks, touch pads, touch screens, still or video recorders/cameras, tracking devices for recognizing gestures, and/or microphones. Network interface 414 allows device 400 to communicate with other computer systems via an electronic communications network, and may include wired or wireless communication over local area networks and wide area networks such as the internet. An audio processor 412 is adapted to generate analog or digital audio output from instructions and/or data provided by the CPU 402, memory 404, and/or storage 406. The components of device 400, including CPU 402, memory 404, data storage 406, user input devices 408, network interface 410, and audio processor 412 are connected via one or more data buses 422.

A graphics subsystem 420 is further connected with data bus 422 and the components of the device 400. The graphics subsystem 420 includes a graphics processing unit (GPU) 416 and graphics memory 418. Graphics memory 418 includes a display memory (e.g., a frame buffer) used for storing pixel data for each pixel of an output image. Graphics memory 418 can be integrated in the same device as GPU 408, connected as a separate device with GPU 416, and/or implemented within memory 404. Pixel data can be provided to graphics memory 418 directly from the CPU 402. Alternatively, CPU 402 provides the GPU 416 with data and/or instructions defining the desired output images, from which the GPU 416 generates the pixel data of one or more output images. The data and/or instructions defining the desired output images can be stored in memory 404 and/or graphics memory 418. In an embodiment, the GPU 416 includes 3D rendering capabilities for generating pixel data for output images from instructions and data defining the geometry, lighting, shading, texturing, motion, and/or camera parameters for a scene. The GPU 416 can further include one or more programmable execution units capable of executing shader programs.

The graphics subsystem 414 periodically outputs pixel data for an image from graphics memory 418 to be displayed on display device 410. Display device 410 can be any device capable of displaying visual information in response to a signal from the device 400, including CRT, LCD, plasma, and OLED displays. Device 400 can provide the display device 410 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experience. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for providing assistive navigation in a video game, comprising:
    receiving input from a user device during a gameplay session of the video game;
    capturing eye gaze of a user during the gameplay to identify a region of a scene of the video game associated with said eye gaze;
    executing a machine learning process during said gameplay session to extract and classify gaze features from the captured eye gaze, game context features, and user input features, the machine learning process uses a neural network for establishing a gaze prediction model for the user; and
    activating gaze navigation for the user during said gameplay session to move a focus of the scene by translating the scene to the region identified using the captured eye gaze and input from the gaze prediction model, wherein said gaze prediction model using said game context features assists in filtering out unintended eye navigation;

wherein activation of the gaze navigation is triggered automatically without said input from the user device.

2. The method of claim 1, wherein the translating occurs gradually toward the region identified using the captured eye gaze and said input from the gaze prediction model.

3. The method of claim 2, wherein the gaze navigation is deactivated upon receiving an input from a user device directing the movement of the focus away from the region.

4. The method of claim 3, wherein deactivating the gaze navigation stops the translating of the focus.

5. The method of claim 2, wherein the gaze navigation remains active while the captured eye gaze remains toward the region of the scene for a period of time that exceeds a first threshold amount of time.

6. The method of claim 1, further comprising,
activating a gaze zoom at the region, the gaze zoom is activated after a second threshold amount of time is detected wherein the eye gaze remains toward the region of the scene.

7. The method of claim 1, further comprising,
activating a gaze zoom at the region, the gaze zoom is activated after a reflex eye gaze is detected when the eye gaze is toward the region of the scene.

8. The method of claim 7, wherein the reflex eye gaze is processed to determine an intent of the user needing a zoom-in view or a zoom-out view of the region.

9. The method of claim 1, wherein the input device is a peripheral device used to interface with a computing device used for executing the game and enabling said gameplay.

10. The method of claim 1, wherein the gaze prediction model further predicts an interest level of the user in the region; and
enabling the activating of the gaze navigation to move the focus of the scene to the region when the interest level of the user is predicted to be above a predetermined threshold.

11. The method of claim 10, wherein the gaze prediction model is trained using a plurality of gameplay sessions that capture user gaze, game context, user inputs and game performance.

12. A method for providing assistive navigation in a video game, comprising:
capturing eye gaze of a user during gameplay of a video game to identify a region of a scene of the video game associated with said eye gaze;
executing a machine learning process during said gameplay session to extract and classify gaze features from the captured eye gaze, extract and classify game context features, and extract and classify user input features, the machine learning process uses a neural network for establishing a gaze prediction model for the user;
activating gaze navigation for the user during said gameplay session to move a focus area of the scene by translating the scene to a new region based on the captured eye gaze and input from said gaze prediction model, wherein said gaze prediction model uses said classified game context features; and
wherein the eye gaze prediction model is configured to filter out one or more captured eye gaze to avoid activating said gaze navigation.

13. The method of claim 12, wherein the activation of the gaze navigation is triggered automatically without said input from the user device.

14. The method of claim 13, wherein the gaze navigation remains active while the captured eye gaze remains toward the region of the scene for a period of time that exceeds a first threshold amount of time.

15. The method of claim 12, wherein the focus is moved by translating the focus gradually toward the region identified using the captured eye gaze and the gaze navigation is deactivated upon receiving an input from a user device directing the movement of the focus away from the new region.

16. The method of claim 15, wherein deactivating the gaze navigation stops the translating of the new region.

17. The method of claim 12, further comprising,
activating a gaze zoom at the region, the gaze zoom is activated after a second threshold amount of time is detected wherein the eye gaze remains toward the region of the scene.

18. The method of claim 12, wherein the filtered out one or more captured eye gaze is a learned lazy-eye syndrome or a nervous twitch or squinting.

\* \* \* \* \*